Aug. 9, 1966 N. L. WISEMAN 3,265,996
DELAY LINE
Filed Sept. 30, 1963 7 Sheets-Sheet 1
FIG. 1
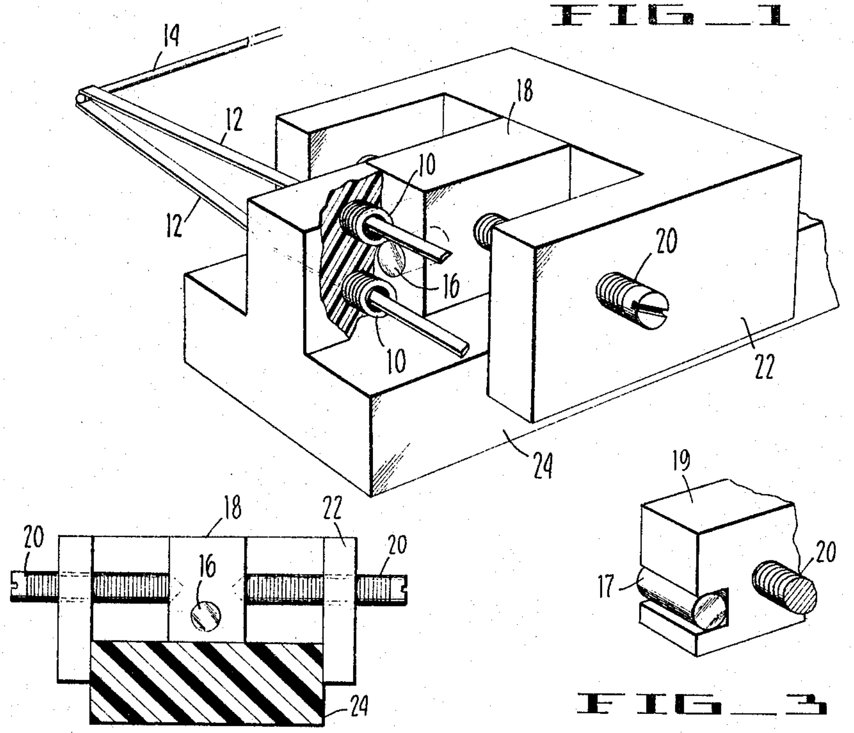
FIG. 1, FIG. 2, FIG. 3
FIG. 4
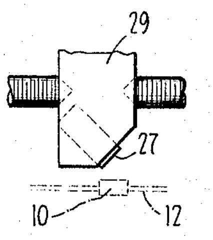
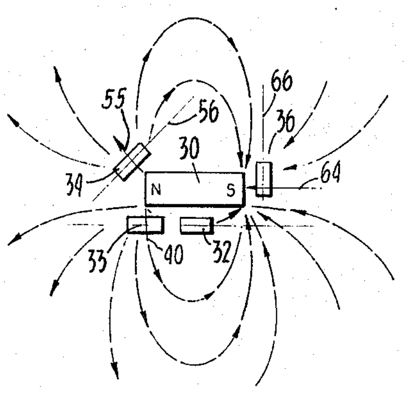
FIG. 5
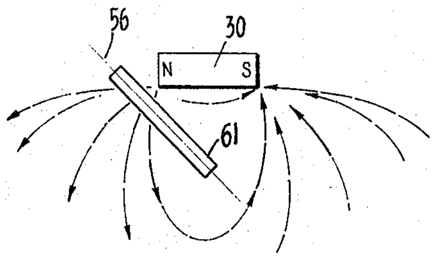
FIG. 6
INVENTOR.
NEIL L. WISEMAN
BY Karl H. Sommermeyer
ATTORNEY Aug. 9, 1966 N. L. WISEMAN 3,265,996

DELAY LINE

Filed Sept. 30, 1963 7 Sheets-Sheet 4

United States Patent Office 3,265,996
Patented August 9, 1966

3,265,996
DELAY LINE
Neil L. Wiseman, Pleasanton, Calif., assignor to Friden, Inc., a corporation of Delaware Filed Sept. 30, 1963, Ser. No. 312,674
10 Claims. (Cl. 333—30)

The present invention relates to transducers such as magnetostrictive transducers for elastic delay lines.

It has been proposed by G. G. Scarrott and R. Naylor that a coil of an output magnetostrictive transducer of a delay line have its turns per unit length conform to a corrective function for improving the wave shape of an output signal. The copending application of George H. Hare, Serial No. 301,850 filed August 13, 1963, for Delay Line discloses a signal transducer, the sensitivity of which is varied or profiled along the signal path according to a function that is like the intensity function of the signal itself.

In accordance with my present invention, I profile the sensitivity of a magnetostrictive transducer by profiling its bias field.

It is an object of my invention to profile the sensitivity of an extended magnetic transducer by profiling the magnetic bias field thereof.

It is a further object to control the profile of a bias field by the position and orientation of a bias magnet.

It is a further object to control the profile of a bias field by the relative strengths, positions and orientations of two or more magnets.

Further objects include the provision of a simple, improved, and low cost construction for a profiled magnetostrictive transducer for a delay line, and the provision of an improved transducer.

These and other objects and advantages of my invention will be apparent from the following description of specific embodiments thereof, taken in connection with the accompanying drawings, wherein:

FIG. 1 is a pictorial view, partly in section, of the transducer structure at one end of an elastic delay line;

FIG. 2 is a partial section viewed toward the right in FIG. 1;

FIG. 3 is a partial pictorial view showing a modification of the structure of FIG. 1;

FIG. 4 is a partial plan view showing another modification of the structure of FIG. 1;

FIGS. 5 and 6 are partially diagrammatic views showing the pattern of magnetic flux in the vicinity of a magnet, and the manner in which that flux intersects coils placed in various positions with respect to the magnet;

FIG. 18 is a similar view showing the arrangement of several magnets and the resulting sensitivity profile for a long transducer coil.

Figure 7:
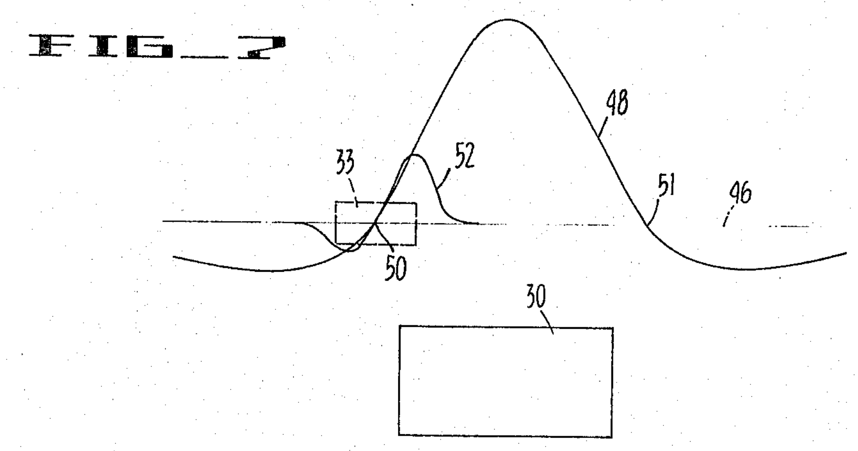
FIGS. 7 through 11 are combined diagrammatic views and plots of field intensity relative to the coil axes and coils shown in FIGS. 5 and 6.

In FIGS. 1 and 2, a pair of transducer coils 10 encircle magnetostrictive ribbons 12 of a transducer of an elastic delay line, which line includes also a torsional transmission member 14, and which generally may be of the construction shown in FIG. 7 of Scarrott Patent No. 3,011,136.

In accordance with the present invention, the magnetic field for biasing the magnetostrictive ribbons 12 is provided by a small, permanent magnet 16 which is adjustably supported with respect to the coils 10, and which occupies an end-on orientation with respect to the coils 10.

The magnet 16 is supported in a block 18 which can be moved longitudinally of the coils 10, and of the magnetostrictive ribbons 12, by means of a pair of adjusting screws 20 which are carried in projections of a slide 22 that slides on a base 24 which also supports the coils 10. The movement of the slide 22 adjusts the position of the magnet 16 toward and away from the coils 10 and the ribbons 12. The block 18, slide 22 and base 24 may be constructed of a suitable nonmagnetic material, such as nylon, and the screws 20 are preferably made of brass or other nonmagnetic material.

The adjustment of the magnet 16 axially of the coils 10 and ribbons 12, by means of the screws 20, permits the magnetic field in the vicinity of the coils 10, and particularly the component thereof along, and in the longitudinal direction of, the coils 10 and ribbons 12, to be profiled to a desirable sensitivity pattern for the coils 10 and ribbons 12. As will be explained presently, a nonsymmetrical arrangement of the magnet 12 can provide two portions of opposite magnetic bias within the effective range of the coil 10. Movement of the magnet 16 toward and away from the coils 10 and ribbons 12 alters the sensitivity as a whole and also provides additional profiling of the field by broadening the lobes thereof.

FIG. 3 shows an alternative construction wherein an adjustable block 19, similar to the block 18, supports a magnet 17 for adjustably holding it in a position in which it is substantially parallel to the coils 10 and ribbons 12. As will be explained, this magnet also provides a desirable profiling of the magnetic field, particularly when it is longitudinally off-center with respect to the coils 10.

In the specific construction of FIGS. 1, 2 and 3, the coils 10 may conveniently be one-tenth of an inch long and the magnets 16 and 17 a quarter of an inch long. However, as will be described, the invention also contemplates the use of coils of much greater length, particularly coils longer than the magnets 16 and 17, and also contemplates the use of two or more such magnets for providing a bias field of a more elaborate profile.

FIG. 4 shows still another construction wherein a magnet 27 is held at an oblique angle of 45° with respect to the axis of the coils 10 and to the direction of the ribbon 12. The magnet 27 is mounted in a truncated block 29 which is substituted in the device of FIGS. 1 and 2 for the mounting block 18, so that the magnet 27 is adjustable both toward and away from the coil 10, and also in the direction axially of the coil 10 and longitudinally of the ribbons 12.

The present invention takes advantage of the divergence and curvature of the lines of force of the magnetic field surrounding the magnets, such as the bar magnets 16, 17 and 27 of FIGS. 1, 3 and 4. FIG 5 shows a bar magnet 30 with north and south poles indicated, and shows also the pattern of the flux lines of the magnetic field surrounding the magnet. Certain positions at which a transducer coil, such as a coil 10 in FIG. 1, can be located in this field by the structures of FIGS. 1, 3 and 4, are indicated at 32, 33, 34 and 36.

A coil in the position 33, lying parallel to the magnet with the central portion of the coil near the end of the magnet, has the lines of flux lying substantially transverse the coil at its central section 40, and diverging from the central portion in other parts of the coil. It is the magnetization of the ribbon 12 in FIG. 1, longitudinal of the ribbon, that contributes to the sensitivity of the transducer. In FIG. 7 this longitudinal component is plotted with respect to the line 46. This line 46 also represents the position of the center line of the magnetostrictive ribbon 12 with respect to the magnet 30, which is also shown in FIG. 7. The curve 48 is a plot of the longitudinal component of the field of the magnet 30 along the axis 46, in which plot the line 46 represents the zero axis. It is to be noted that the sign of the curve 48 changes at the points 50 and 51 near the ends of the magnet 30. This zero point agrees with the flux pattern shown in FIG. 5 wherein, for example, the direction of the field is directly transverse the coil 33 at the plane 40, opposite the end of the magnet, at which plane the longitudinal component is zero. Because the field diverges in both directions from this central plane 40, the longitudinal component of the field has opposite signs on the two sides of that plane. Also shown in FIG. 7 is the position of the transducer coil 33 with respect to the magnet 30 and with respect to the central axis 46 of the magnetostrictive ribbon 12. Considering the coil 33 as the output coil of the delay line, the sign of the output signal depends on the sign of the lingitudinal component of the bias magnetization. Accordingly, the two halves of the coil will exhibit sensitivities of opposite sign, that is, will generate voltages of opposite sign. Furthermore, the coil will show some response to the portions of the ribbons 12 beyond the ends of the coil. The overall sensitivity of the coil 33 to an elastic wave in the ribbon 12 will be approximately as shown by the curve 52 in FIG. 7. That is, viewing coil 33 as an output coil, curve 52 shows the voltage that will be developed in the coil 33 by a short elastic wave at each position of the wave along the longitudinal axis 46 of the ribbon 12.

Figure 8:
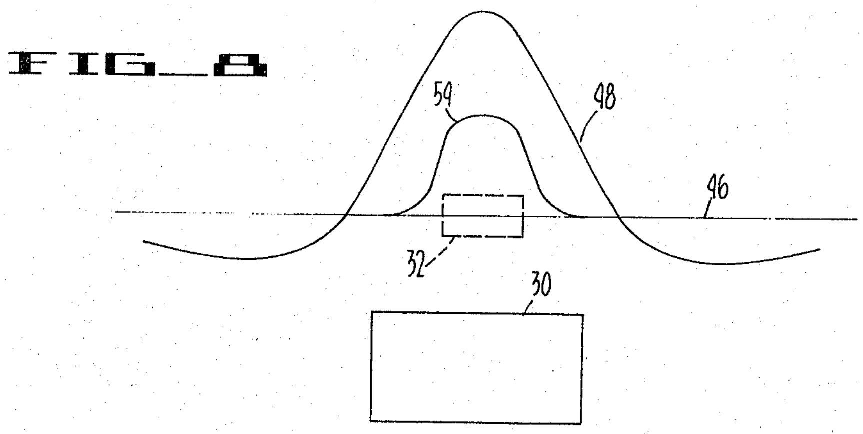

Also shown in FIG. 5 is a position 32 in which the coil lies substantially parallel to the magnet and equidistant from its two ends, as in magnetostrictive transducers of prior delay lines. It is to be noted that in no part of this position 32 do the flux lines extend directly across the coil 32, that is, in the vertical direction in FIG. 5. Accordingly, the longitudinal component of the bias field will not be zero within this coil position. FIG. 8 shows the sensitivity pattern of the coil in this position 32. There the magnet 30 is shown in its position relative to the center line 46 of the ribbons 12 just as in FIG. 7, and shows the same curve 48 of the component of flux longitudinal of the ribbons 12. FIG. 8 shows the coil position 32, and has zero values only well beyond as is shown in FIG. 5. Curve 54 is a sketch of the sensitivity of coil 32 to a short elastic wave on the ribbon 46, plotted against the position of that wave on the ribbon. It is to be noted that this curve 54 does not change sign, has a good uniformity throughout the length of the coil position 32, and has zero values only well beyond the ends of the coil position 32.

FIG. 5 also shows a coil position 34 that is oblique with respect to the magnet 30. Like the coil position 33, this position 34 has a plane 55 in which the magnetic flux extends directly transverse it and with the lines of the flux diverging in both directions from this plane.

Figure 9:
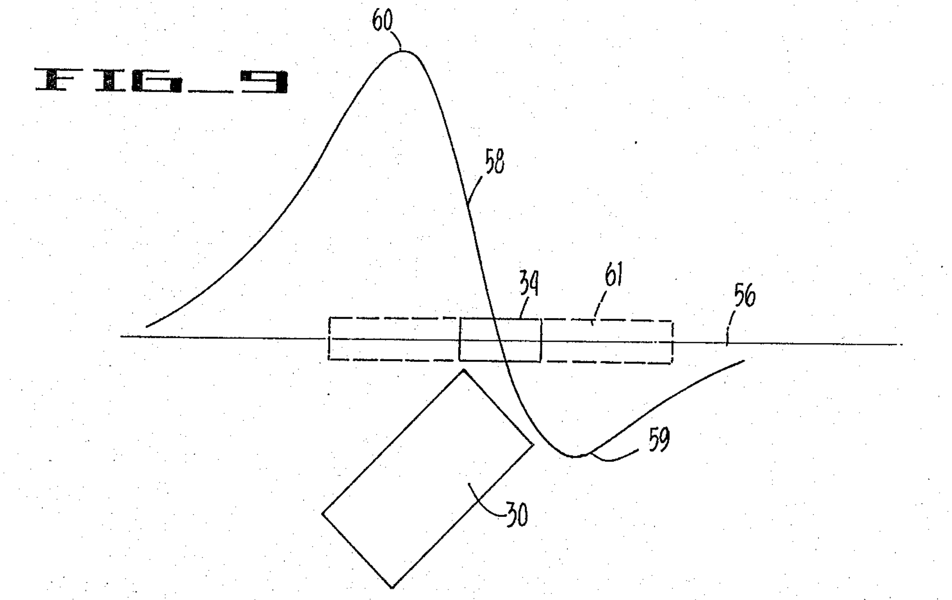

FIG. 9 shows a plot similar to the plots of FIGS. 7 and 8. There the line 56 is the position of the central axis of coil position 34 in FIG. 5, and the magnet 30 is shown in FIG. 9, oblique to this line, similar to its position in FIG. 5. The curve 58 in FIG. 9 is a plot of the sign and intensity of the field component along the line 56. It is to be noticed that the portions of opposite sign of this curve constitute similar lobes of different size, with a highly linear portion near the zero part of the curve at the location of the coil position 34. This linearity is advantageous for itself, and the different sizes of the two lobes 59 and 60 can be taken advantage of with a long coil, as indicated by the dotted outline 61 in FIG. 9. The magnetic flux pattern about such a long coil is shown in FIG. 6.

Figure 10:
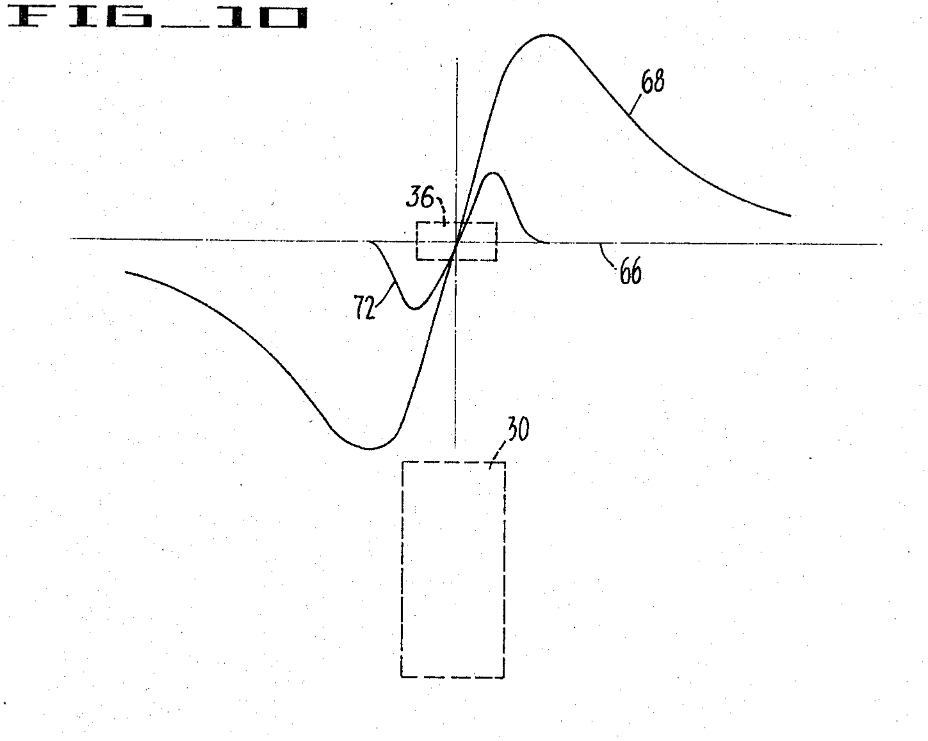
Figure 11:
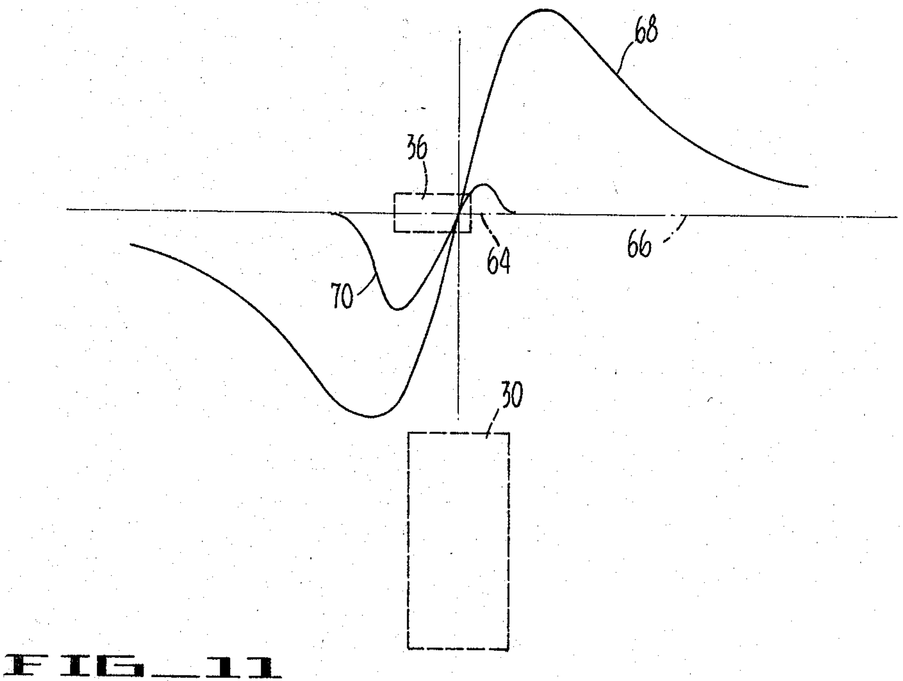

FIG. 5 also shows a coil position 36 opposite one end of the magnet and lying nonsymmetrical with respect to the center line of the magnet. It is to be noted that, on the center line of the magnet, the field vector 64 is perpendicular to the coil axis 66, and that on both sides of this vector, the field converges toward the vector 64. The resulting longitudinal component of the field along the central axis 66 of the coil 36 is plotted as the curve 68 in FIG. 11. The resulting sensitivity profile of a coil in the position 36 is shown in FIG. 11 by the curve 70. It is to be noted that the lobe of one sign here is much larger than the lobe of the other sign because of the noncentral position with respect to coil 36 of the part of the field having a zero component in the direction of the axis of the coil, that is, in the direction of the center line of the ribbon 12 in FIG. 1. For comparison, FIG. 10 shows the coil sensitivity profile 72 when the magnet 30 is similarly arranged end-on, but is aligned with the mid-point of the coil.

As is explained in the copending application of George H. Hare previously referred to, it is desirable to provide the coil of a magnetostrictive transducer of an acoustic delay line with a sensitivity profile that matches the transmission characteristics of the delay line for causing the output signal to coalesce, and for providing a single sharp output peak with good resolution and high signal-to-noise ratio. I have found that a high degree of correction of the output signal can be obtained by approximating the theoretically ideal, sensitivity profile, that such a good approximation can be obtained with the magnet structures and arrangements illustrated in FIGS. 1 through 11, and that good results can be obtained simply by trial and error, that is, by adjusting the position of the magnets while the line is operating and observing the output signal on an oscilloscope.

It will be appreciated that the sensitivity profiles shown in FIGS. 7 through 11 are merely illustrative of the versatility of the construction of the present invention. Thus, by moving the magnet 17 of FIG. 3, by means of the adjusting screws 20, the sensitivity profile of the coils, such as the transducer coils 10, can be changed from that shown by the curve 54 in FIG. 8 to that shown by the curve 52 in FIG. 7. Additional profiles are obtainable by moving the coil to the left of the position 33 shown in FIG. 7. Similarly, in FIG. 1 the magnet 16 can be moved by the screws 20 in the direction of the ribbons 12 for obtaining sensitivity profiles 70 of FIG. 11 and 72 of FIG. 10, and all profiles between them, as well as other profiles beyond them, particularly those obtainable by moving the magnet 30 farther toward the right with respect to the coil position 36 in FIG. 11.

In an elastic delay line wherein the wire 14 of FIG. 1 was composed of a nickel iron alloy known as "NiSpan," and was thirty-thousandths of an inch in diameter and approximately forty feet long, and the ribbons 12 were of nickel, two-thousandths by twenty-thousandths in cross-section, I obtain best results using the end-on magnet arrangement of FIG. 1.

Figure 12:
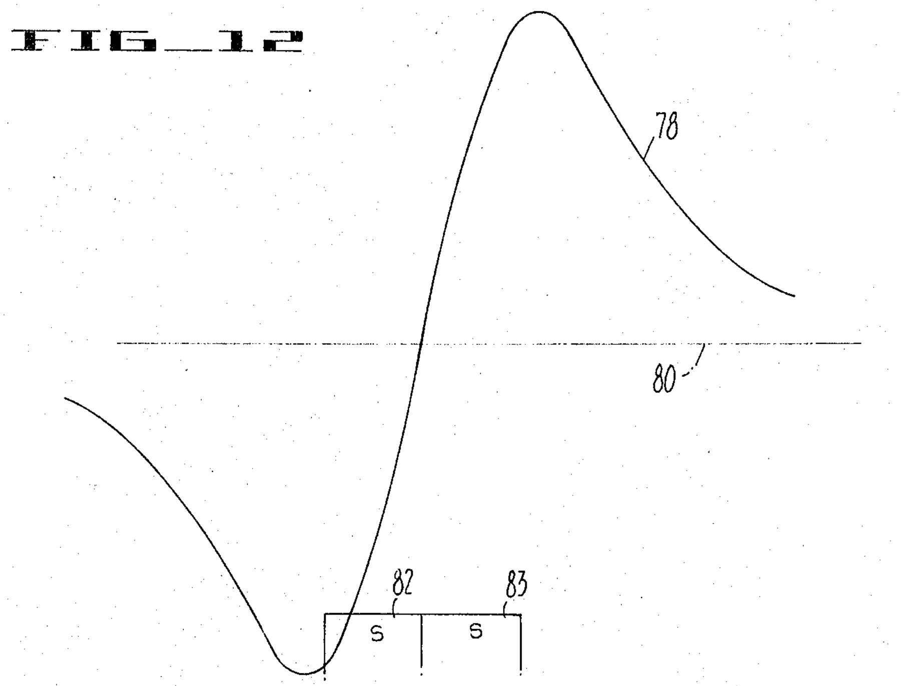
FIGS. 12 through 17 are similar, combined diagrammatic and graphical views showing the field intensities resulting from various magnet arrangements.
Figure 13:
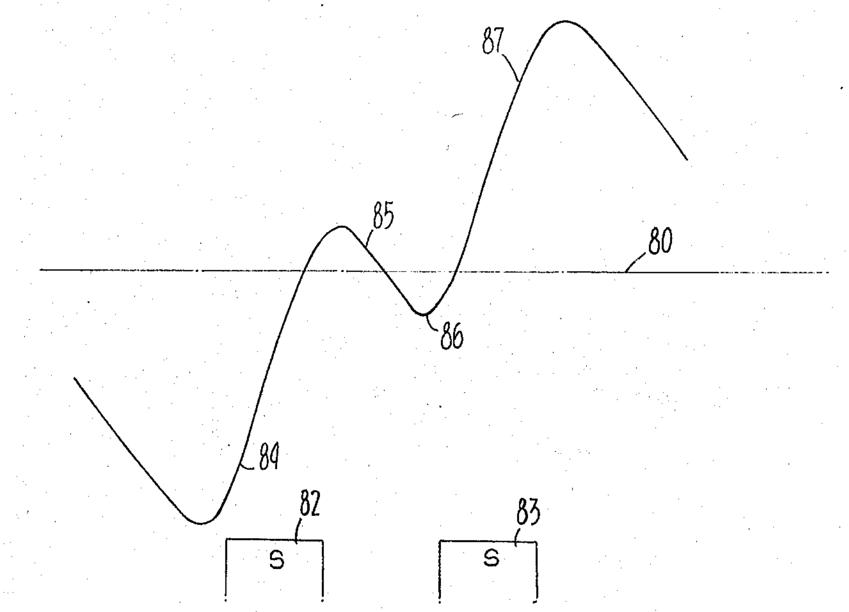
Figure 14:
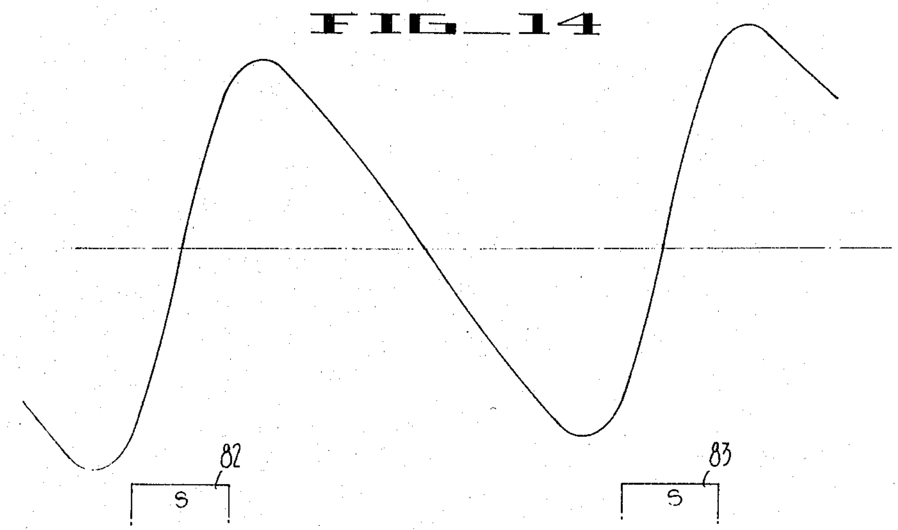

FIGS. 12 to 17, inclusive, further illustrate the versatility of the present invention. In FIG. 12 the curve 78 is a plot of the field intensity component along a coil axis 80 to which a pair of magnets 82 and 83 are faced end-on to the coil, with like poles side-by-side. This curve shows two similar lobes of opposite signs. In the arrangement of FIG. 12, the two magnets 82 and 83 in side-by-side engagement with like poles together are equivalent to a single broad magnet. When these two magnets are separated somewhat, their field intensity along the line 80, and in the direction of line 80, is shown in FIG. 13. The sensitivity curve shows additional zero crossings, so that the curve has four lobes 84, 85, 86 and 87 of alternate sign. As the two similar magnet poles 82 and 83 are separated further, as shown in FIG. 14, the four lobes attain a more uniform size.

Figure 15:
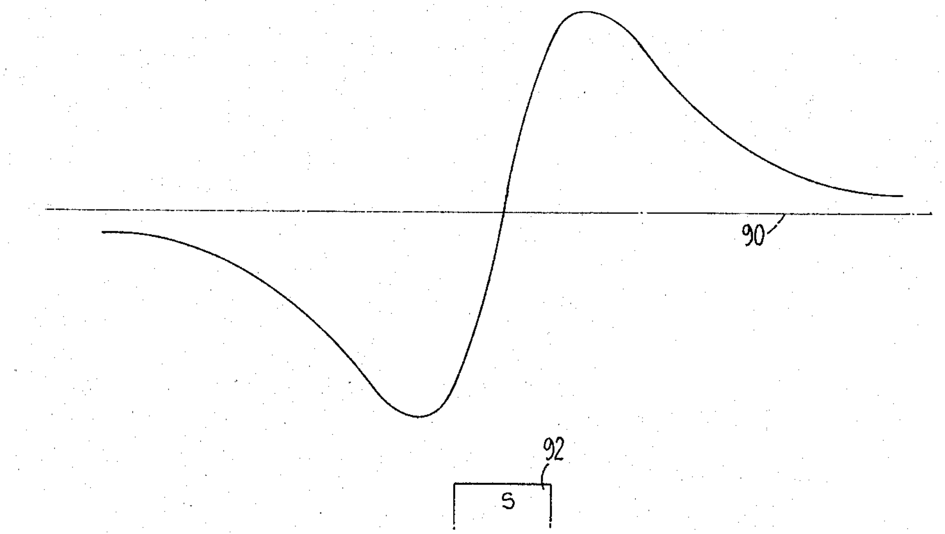
Figure 16:
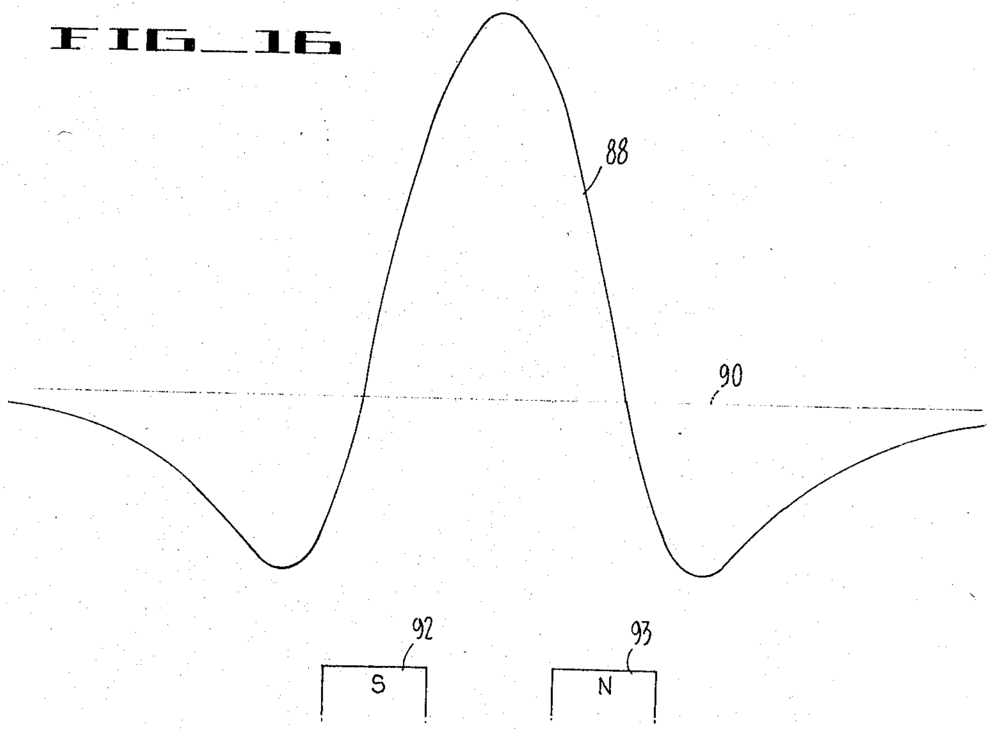
Figure 17:
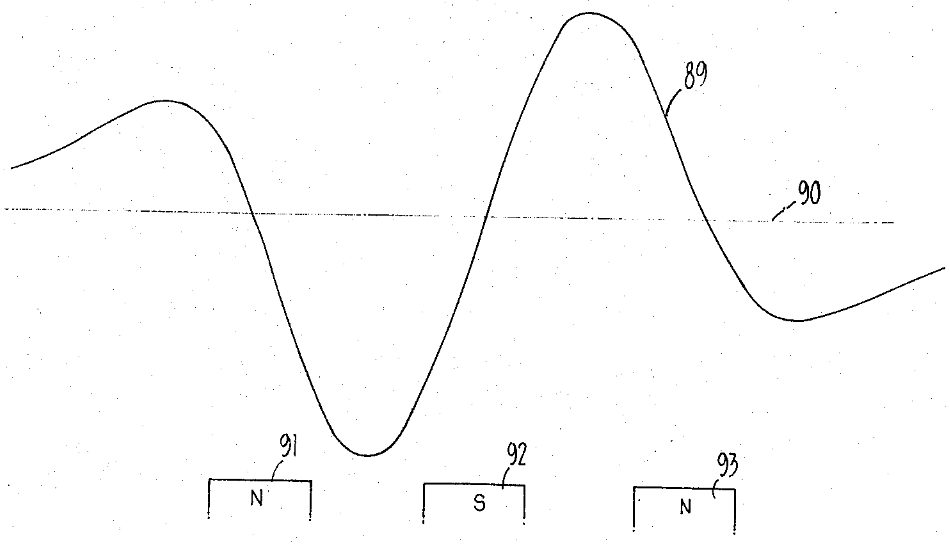
Figure 10:
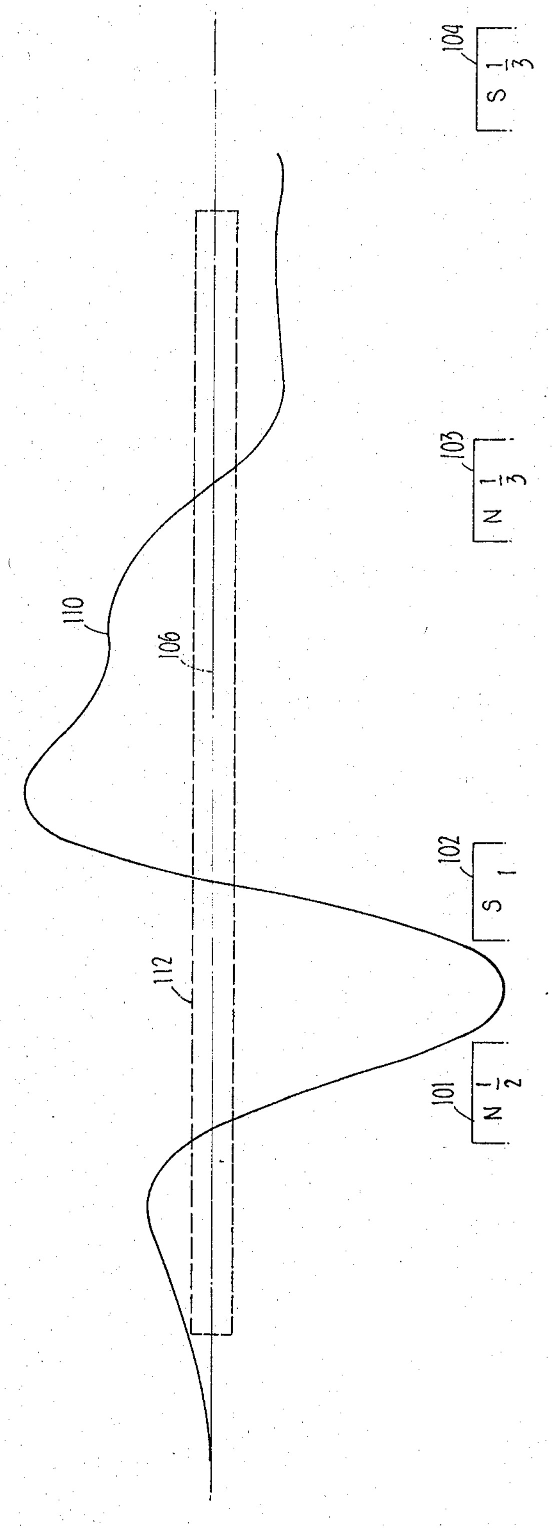

FIG. 15 is similar to FIG. 12 but shows the field of only a single magnet for better comparison with FIGS. 16 and 17. FIG. 16 shows the plot 88 of the field intensity component along a coil axis 90 with two magnets 92 and 93 arranged end-on toward it with unlike poles facing the coil axis. FIG. 17 shows the plot 89 of the field intensity component along the coil axis 90 resulting from three end-on magnets 91, 92 and 93 of alternate polar arrangement, as indicated by the polarity signs "N" and "S." These three figures, 15 to 17 show that one magnet in this configuration provides two lobes of opposite signs, two magnets provide three lobes of alternately opposite signs, and three magnets provide four lobes. It is apparent that this pattern can be extended, and that any number of similar lobes can be provided by additional magnetic poles of alternate polarity for providing a desired field intensity profile.

FIG. 18 illustrates a simple but very satisfactory approximation to the coil sensitivity curve that matches the transmission characteristic of a delay line, as described in the copending application of George H. Hare, Serial No. 301,850 previously referred to. There are desired profile of sensitivity for one coil, such as the output coil, is determined by operating the line with short coils, such as one-tenth of an inch long, for both input and output. The input coils are supplied with a short, square-wave signal, and the wave form of the output signal, as shown by an oscilloscope trace, is recorded. The output coil is constructed, having a length substantially equal to the length of the elastic wave in the output transducer, approximately two inches, and having a sensitivity profile like the wave shape of the elastic wave at that coil. In said application the sensitivity of the coil is given the desired profile by varying the turn density along the length of the two-inch coil. According to the present invention, the desired sensitivity profile of such a two-inch long coil is obtained by varying the intensity of the magnetic field that biases the magnetostrictive ribbon within the coil. FIG. 18 shows an arrangement of four bias magnets 101, 102, 103 and 104 of relative magnetic intensities, one-half, one, one-third and one-third, respectively, as shown in FIG. 18, the magnets having alternate polarities and being spaced as shown. The positions of these magnets are end-on with respect to a coil axis 106, that is, with respect to the center line of the magnetostrictive ribbons.

Curve 110 is a plot of the magnetic field component along, and in the direction of, the coil axis 106. A transducer coil 112 of the length and in the position shown in FIG. 18, has a sensitivity function substantially the same as the curve 110. This curve is sufficiently like the desired curve shown in the Hare application, to provide a high degree of correction to the signal. The present construction has the advantage that the positions of the magnets can be adjusted for further improving the performance while the system is in operation.

The operation of such a delay line, including the magnetostrictive transducers at its two ends, is reciprocal. Although the basis of operation may be understood best by thinking of the sensitivity-profiled coil at the output, the line has the same transmission characteristics for both directions of signal travel. Thus, the coil with the profiled sensitivity may be employed as the input coil or the output coil with the same results. Alternatively, both the input and output transducers may have profiled sensitivity patterns.

It will be apparent that my present invention is not limited to the specific structures and embodiments herein shown and described, and that the invention is capable of numerous variations within the scope of the appended claims.

I claim:

1. In an electromagnetic transducer for a traveling signal wave, an electric coil extended along the path of travel of said wave for interacting with said wave, the intensity of the action between said wave and each portion of said coil being a function of the intensity of a magnetic field at said portion of the coil, and means separate from said coil for producing a nonuniform magnetic field at said coil, the intensity of which field varies along said path of travel of said wave according to a desired, nonuniform, sensitivity profile for imposing a corrective alteration on the wave shape of an output signal from said transducer.

2. The combination of claim 1 wherein a movable permanent magnet is adjacent said coil for producing said non-uniform magnetic field, said magnet being adjustable relative to said coil in the direction of the travel of said wave.

3. In a magnetostrictive transducer, an elongate magnetostrictive member, an elongate coil surrounding said member, and means separate from said coil for providing in said member and adjacent said coil a nonuniform bias magnetic field that varies along said member according to a desired, nonuniform, sensitivity profile for imposing a corrective alteration on the wave shape of an output signal from said transducer.

4. The combination of claim 3 wherein said means for providing a bias field includes a permanent magnet adjacent said member and coil, and means for supporting said magnet in a plurality of adjusted positions.

5. The combination of the immediately preceding claim wherein said magnet is adjustable in the direction along the path of said wave.

6. In a magnetostrictive transducer, an elongate magnetostrictive member, an elongate coil surrounding said member, and a permanent magnet adjacent said member and coil, the poles of said magnet lying at different distances from said member for providing in said member and adjacent said coil a nonuniform, bias, magnetic field that varies along said member according to a desired, sensitivity pattern.

7. The combination of the immediately preceding claim wherein said magnet is adjustably movable with respect to said coil.

8. The combination of the immediately preceding claim wherein said magnet is adjustably movable with respect to said coil in a direction along the path of movement of said wave.

9. The combination of claim 6 wherein the poles of said magnet lie along a line generally perpendicular to the direction of the path of travel of said wave.

10. The combination of claim 6 wherein the poles of said magnet lie along a line oblique to the direction of the path of travel of said wave.

References Cited by the Examiner

UNITED STATES PATENTS

| | | | |
|---|---|---|---|
| 2,946,968 | 7/1960 | Faulkner | 333—30 |
| 3,046,501 | 7/1962 | Dell et al. | 333—30 |
| 3,173,131 | 3/1965 | Perucca | 333—30 |

HERMAN KARL SAALBACH, *Primary Examiner.*

ELI LIEBERMAN, *Examiner.*

R. F. HUNT, *Assistant Examiner.*